(12) United States Patent
Sugiura

(10) Patent No.: US 7,756,611 B2
(45) Date of Patent: Jul. 13, 2010

(54) ON-BOARD DEVICE HAVING APPARATUS FOR SPECIFYING OPERATOR

(75) Inventor: Makiko Sugiura, Hekinan (JP)

(73) Assignee: DENSO CORPORATION, Kariya (JP)

( * ) Notice: Subject to any disclaimer, the term of this patent is extended or adjusted under 35 U.S.C. 154(b) by 245 days.

(21) Appl. No.: 11/822,165

(22) Filed: Jul. 3, 2007

(65) Prior Publication Data

US 2008/0053233 A1 Mar. 6, 2008

(30) Foreign Application Priority Data

Aug. 30, 2006 (JP) ............... 2006-234204

(51) Int. Cl.
*G05D 1/00* (2006.01)
(52) U.S. Cl. ............... 701/1; 701/33; 701/36; 280/735
(58) Field of Classification Search ............ 701/1, 701/33, 36, 200; 280/735; 180/167
See application file for complete search history.

(56) References Cited

U.S. PATENT DOCUMENTS 5,959,612 A 9/1999 Breyer et al.

2003/0187560 A1* 10/2003 Keller et al. ............ 701/50
2004/0158374 A1 8/2004 Suzuki
2006/0279528 A1 12/2006 Schobben et al.
2007/0265745 A1 11/2007 Styles et al.

FOREIGN PATENT DOCUMENTS

| JP | A-2002-133401 | 5/2002 |
| JP | A-2006-64547 | 3/2006 |

OTHER PUBLICATIONS

Office Action dated Aug. 28, 2009 in corresponding German Patent Application No. 10 2007 028 063.9-34 (and English translation).

* cited by examiner

*Primary Examiner*—Gertrude Arthur Jeanglaud
(74) *Attorney, Agent, or Firm*—Posz Law Group, PLC

(57) ABSTRACT

An operator-specifying apparatus is combined with an on-board device such as a navigation device mounted on an automotive vehicle. An ultrasonic sensor device is mounted on a frame of a display panel of the navigation device. A hand of a person who is manipulating the navigation device, a driver or an assistant, is detected by the ultrasonic sensor device. If it is determined that the driver is manipulating (or about to manipulate) the navigation device when the vehicle is being driven, manipulation of the navigation device is prohibited to secure safety in driving. On the other hand, if it is found out the assistant is operating the navigation device, such prohibition is canceled to effectively use the navigation device.

15 Claims, 6 Drawing Sheets

FIG. 6A1
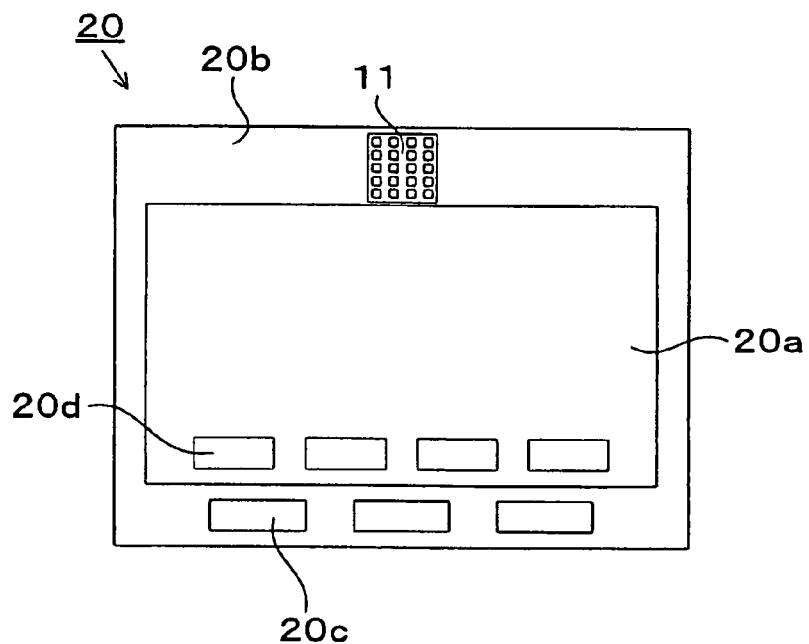
FIG. 6A2
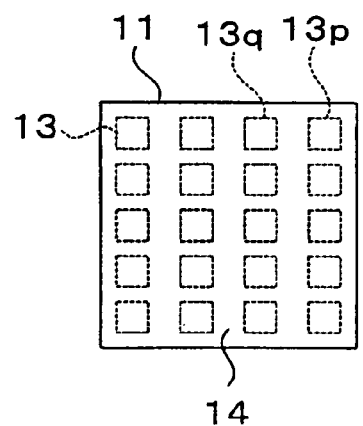
FIG. 6B
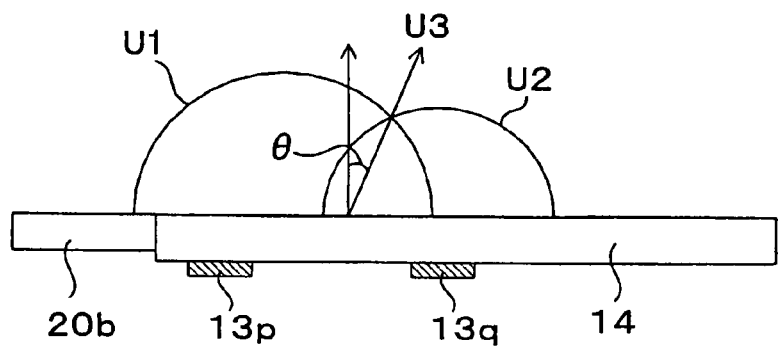

ON-BOARD DEVICE HAVING APPARATUS FOR SPECIFYING OPERATOR

CROSS-REFERENCE TO RELATED APPLICATION

This application is based upon and claims benefit of priority of Japanese Patent Application No. 2006-234204 filed on Aug. 30, 2006, the content of which is incorporated herein by reference.

BACKGROUND OF THE INVENTION

1. Field of the Invention

The present invention relates to a device mounted on an automotive vehicle, such as a navigation device, the device including an apparatus for determining a person who is operating the device.

2. Description of Related Art

In an on-board device such as a navigation device, operation of the device by a driver is prohibited while an automobile is being driven to secure safety in driving. Safety in driving is adversely affected if the driver operates the device, e.g., by inputting a target destination to the navigation device. On the other hand, if a passenger sitting on an assistant seat next to the driver (referred to as an assistant) operates the on-board device such as the navigation device, there is no danger in driving. If the device is not prohibited to be operated by the assistant, various information may be collected by the assistant during driving through the navigation device, or a new destination may be inputted by the assistant.

To determine a person (a driver or an assistant) who operates the on-board device during driving, JP-A-2002-133401 proposes to use a CMOS camera and to permit operation of the on-board device if it is determined that the assistant is operating the device. In the proposed device, however, the C-MOS camera is essential, and images taken by the CMOS camera have to be analyzed. Therefore, the device becomes complex and expensive.

SUMMARY OF THE INVENTION

The present invention has been made in view of the above-mentioned problem, and an object of the present invention is to provide an improved apparatus for specifying an operator of an on-board device, the apparatus being simple and inexpensive.

The apparatus for specifying an operator according to the present invention is applied to or combined with an on-board device such as a navigation device mounted on an automobile vehicle. The operator-specifying apparatus includes an ultrasonic sensor device for detecting positions of an operator's hand and a device for determining or specifying the operator based on signals supplied form the ultrasonic sensor device.

The navigation device includes an operating device for manipulating the navigation device and for inputting commands, including push buttons mounted on a frame of a display panel and touch buttons formed on the display panel. The operating device is manipulated by a left hand of a driver or a right hand of an assistant, assuming a driver's seat is at a right side of the vehicle and an assistant is seated on an assistant's seat positioned at the left side of the driver's seat. The ultrasonic sensor device detects an operator's hand, either the driver's left hand or the assistant's right hand. If the driver's hand is detected, it is determined that the driver is manipulating the operating device. If the assistant's hand is detected, it is determined that the assistant is manipulating the operating device.

When it is determined that the operator is the driver, while the vehicle is being driven, manipulation of the operating device, i.e., manipulation of the navigation device is prohibited. On the other hand, if the operator is the assistant, the prohibition is canceled. Since manipulation of the navigation device by the driver is prohibited when the vehicle is being driven, safety in driving is enhanced. On the other hand, since the navigation device can be manipulated by the assistant even when the vehicle is being driven, the navigation device is effectively used.

The ultrasonic sensor device may be mounted on a frame of a display panel via a sonic-wave-adjusting layer. Alternatively, the ultrasonic sensor device may be directly mounted on a rear surface of the display panel such as a liquid crystal display panel. The ultrasonic sensor device may include a pair of ultrasonic sensors each having a narrow directivity, an ultrasonic sensor for detecting the driver's left hand and another ultrasonic sensor for detecting the assistant's right hand. Only one ultrasonic sensor may be mounted on a center portion of the display panel frame, and its position or angle may be changed by a mover to transmit the ultrasonic waves toward a desired direction. The ultrasonic sensor device may include plural sensor elements, and their transmitting phase differences are controlled to direct the ultrasonic waves toward a desired direction.

According to the present invention, a person who is operating the on-board device, a driver or an assistant, is easily specified by using an ultrasonic sensor device. Other objects and features of the present invention will become more readily apparent from a better understanding of the preferred embodiment described below with reference to the following drawings.

BRIEF DESCRIPTION OF THE DRAWINGS

FIG. 6A1 is a front view showing a display panel on which an ultrasonic sensor device including plural ultrasonic vibrator elements is mounted;

FIG. 6A2 is a front view showing the sensor device in an enlarged scale;

FIG. 6B is a schematic side view showing directivities of ultrasonic waves transmitted from two ultrasonic vibrator elements;

DETAILED DESCRIPTION OF THE PREFERRED EMBODIMENT

Figure 1:
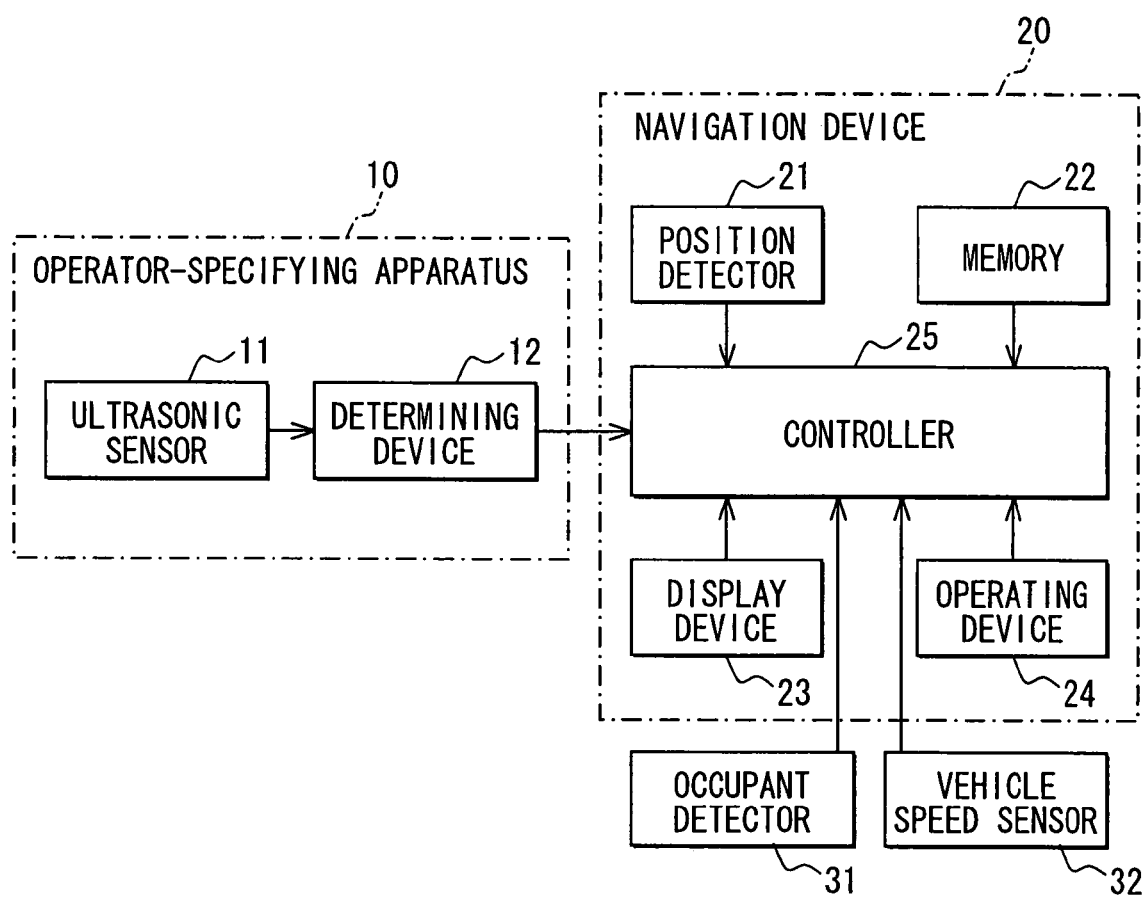
FIG. 1 is a block diagram showing a navigation device having an apparatus for specifying an operator of the navigation device.

A preferred embodiment of the present invention will be described with reference to accompanying drawings. FIG. 1 is a block diagram showing a navigation device 20 and an apparatus 10 for determining a person who operates the navigation device. That is, the apparatus 10 determines a person who is operating the navigation device, a driver or an assistant who is sitting on an assistant seat next to the driver. The person sitting on the assistant seat is referred to as an assistant.

The apparatus 10 includes an ultrasonic sensor 11 that detects a person operating the navigation device 20 (referred to as an operator) and a determining device 12 that determines the operator based on signals outputted from the ultrasonic sensor 11. The navigation device 20 includes: a position detector 21 having a GPS sensor or the like for detecting a position of a vehicle; a memory 22 for storing map data and programs such as a search program and a program for processing images; a display device 23 for displaying maps and a present position of the vehicle; an operating device 24 for inputting commands; and a controller 25. The controller 25, including a CPU, a ROM, a RAM, and an input-output interface such as an AD converter, controls operation of the navigation device 20 according to the programs stored in the memory 22 and commands inputted from the operating device 24. The determining device 12 is electrically connected to the controller 25.

The navigation device 20 calculates a route to a destination inputted by the operator based on a present position of the vehicle detected by the position detector 21 and the map data stored in the memory 22. The route to the destination is displayed on a display device 23. The navigation device 20 is disposed in a space formed in an instrument panel of the vehicle, and a display panel 20a (refer to FIG. 2A) of the navigation device 20 is installed in a center of the instrument panel between a driver and an assistant (a person occupies an assistant seat next to the driver's seat is referred to as an assistant) In the following description, it is assumed that the driver's seat is located at the right side of the vehicle.

Figure 2A:
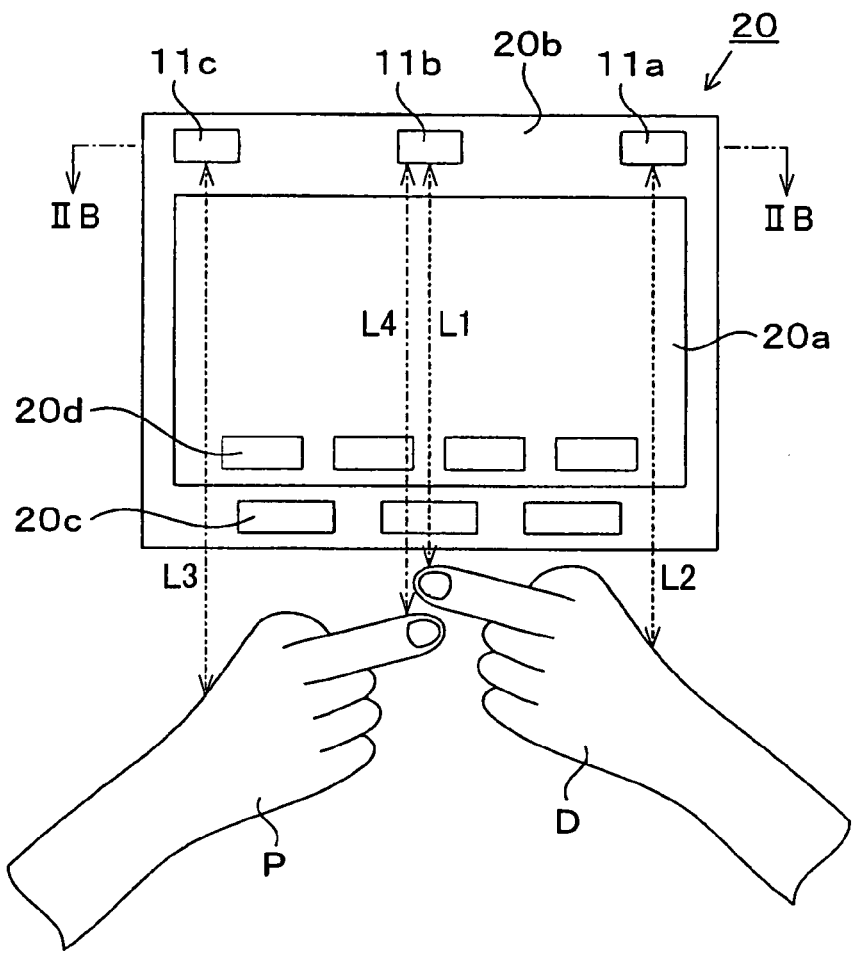
FIG. 2A is a front view showing a display panel of the navigation device, ultrasonic sensors being mounted on a frame of the display panel.

As shown in FIG. 2A, the display panel 20a includes a frame 20b, three ultrasonic sensors 11a, 11b, 11c positioned on an upper portion of the frame, and push buttons 20c positioned on a lower portion of the frame. Touch buttons are displayed on a lower portion of the display panel 20a. Commands and information are inputted to the navigation device 20 from the push buttons 20c and/or the touch buttons 20d. The push buttons 20c and the touch buttons 20d are operated by either a left hand D of the driver or a right hand P of the assistant.

Figure 2B:
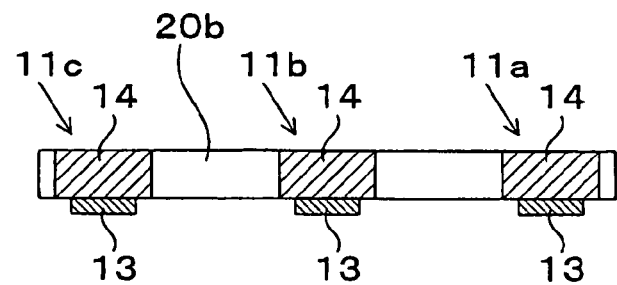
FIG. 2B is a cross-sectional view showing the ultrasonic sensors mounted on the frame of the display panel, taken along line IIB-IIB shown in FIG. 2A.

As shown in FIG. 2B, each ultrasonic sensor 11a, 11b, 11c is composed of an ultrasonic vibrator 13 disposed on an adjusting layer 14. One surface of each adjusting layer 14, on which the ultrasonic vibrator 13 is not mounted, faces a passenger compartment. The right ultrasonic sensor 11a (the ultrasonic sensor located at the right side of the frame 20b is referred to as the right ultrasonic sensor) transmits ultrasonic waves toward the driver's left hand D and detects a distance between the driver's left hand D and the right ultrasonic sensor 11a. Similarly, the left ultrasonic sensor 11c transmits ultrasonic waves toward the assistant right hand P and detects a distance between the assistant's right hand P and the left ultrasonic sensor 11c. The center ultrasonic sensor 11b transmits ultrasonic waves toward the center portion of the passenger compartment and detects a distance from the center ultrasonic sensor 11b and either the driver's left hand D or the assistant's right hand P.

The ultrasonic waves used in this device include sonic waves having frequencies higher than 20 kHz, which are not audible by a human. The ultrasonic vibrator 13 is made of a piezoelectric material such as PZT. The ultrasonic vibrator 13 transmits and receives the ultrasonic waves via the adjusting layer 14, and thereby detects a distance to an object in the passenger compartment. The adjusting layer 14 made of a resin material such as polycarbonate alleviates a sound impedance difference between air (a sound transmitting medium) and the ultrasonic vibrator 13, thereby improving efficiency in transmitting the ultrasonic waves.

The adjusting layer 14 determines a directivity of the ultrasonic waves. As shown in FIG. 2B, a width (a dimension in the horizontal direction) of the adjusting layer 14 is made relatively wide while its height (a dimension in the vertical direction) is made relatively small. By setting the dimensions of the adjusting layer 14 in this manner, directivity in the horizontal direction becomes narrow, and directivity in the vertical direction becomes wide. For example, the directivity in the horizontal direction may be made within a range of ±5° (5° each in both sides of a normal line). In this manner, it is possible to make the detection areas of the right ultrasonic sensor 11a and the left ultrasonic sensor 11c not to overlap each other. Thus, the ultrasonic waves reflected from the driver's left hand D and the assistant's right hand P are clearly distinguished from each other. Since the directivity of the ultrasonic sensors 11a, 11b, 11c in the vertical direction is made wide, the hands D, P can be detected irrespective of their horizontal height.

The adjusting layers 14 may be made of a material having a similar color to that of the frame 20b. In this manner, an ornamental design of the display panel 20a can be improved. Similarly, by selecting a proper color for the push buttons 20c, an ornamental effect of the display panel 20a can be enhanced.

Figure 3:
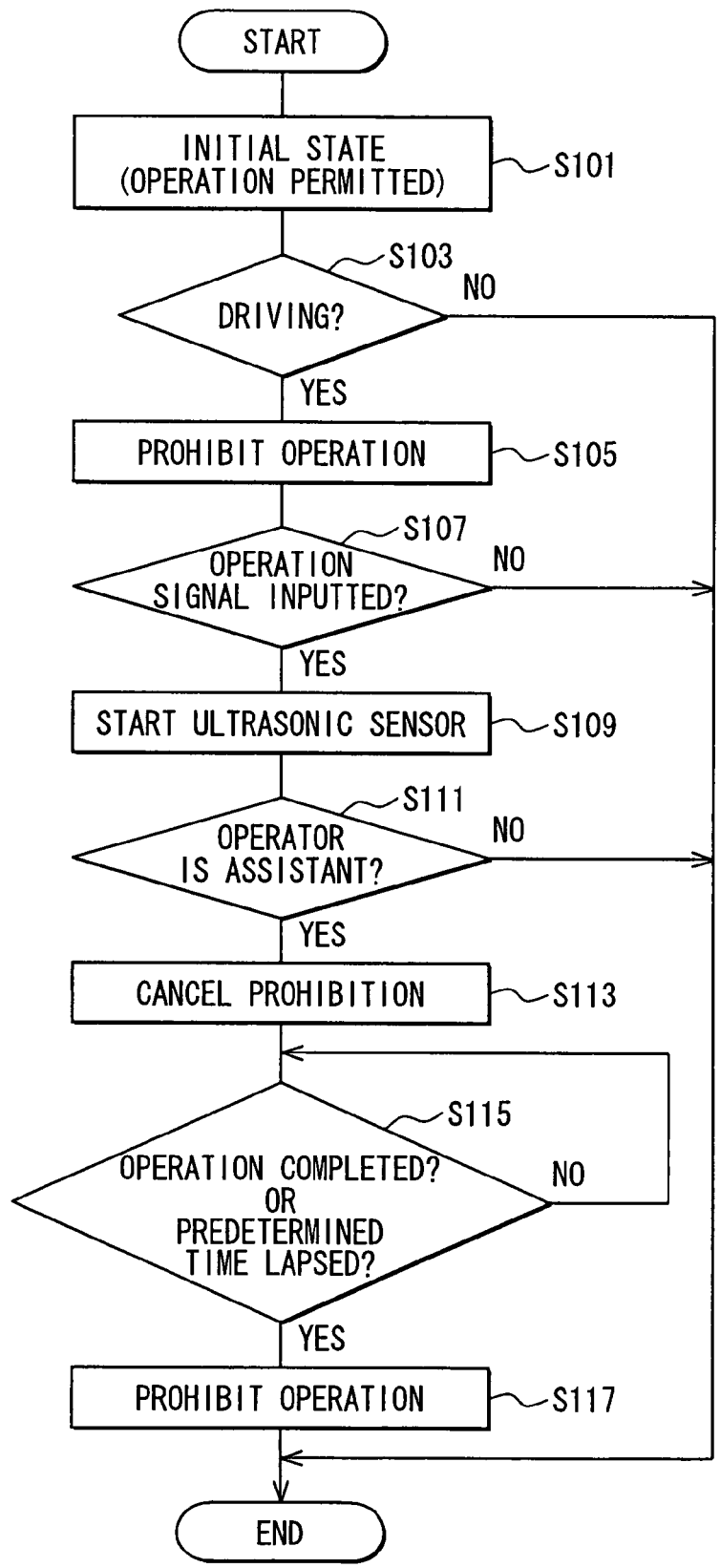
FIG. 3 is a flowchart showing a process for prohibiting operation of an on-board device and for canceling the prohibition.

With reference to FIG. 3, a process for prohibiting manipulation of the navigation device 20 (referred to as a prohibiting process) and a process for canceling the prohibition (referred to a cancellation process) will be described. A person, an assistant or a driver, who is manipulating the navigation system 20 by touching the operating device 24 is determined by the determining device 12 in the operator-specifying device 10 based on signals from the ultrasonic sensors 11. The prohibiting process and the cancellation process are carried out in the controller 25 in the navigation device 20. The prohibiting process and the cancellation process shown in FIG. 3 are performed only when a passenger is seated on the assistant seat next to the driver. Whether a passenger is seated on the assistant seat is determined by the occupant detector 31 shown in FIG. 1. This is because manipulation of the navigation system 20 by the driver is always prohibited when the vehicle is driven, and the driver is allowed to manipulate it only when the vehicle is not driven.

At step S101, the operator-specifying apparatus 10 is brought to an initial state where the ultrasonic sensors 11 are not in operation and the navigation device 20 is allowed to be operated. At the next step S103, whether the vehicle is being driven or not is determined based on signals from the vehicle speed sensor 32. If the vehicle is not being driven, the process comes to the end because there is no danger if the driver manipulates the navigation device 20. If the vehicle is being driven, the process proceeds to step S105, where manipulation or operation of the navigation device is prohibited.

At step S107, whether the operating device 24 (i.e., the push buttons 20c or the touch buttons 20d) are operated by the driver or the assistant is determined. If the operating device is not operated, the process comes to the end. If it is operated, the process proceeds to step S109, where the ultrasonic sensors 11 (11a, 11b and 11c) are brought into operation.

At step S111, the person who manipulates the operating device 24 is specified, i.e., the operating device 24 is manipulated by the driver or the assistant. The operator is specified based on signals from the ultrasonic sensors 11. As shown in FIG. 2A, if the driver operates the operating device 24, the driver's left hand D is within a predetermined distance from the right ultrasonic sensor 11a. The distance is calculated based on a traveling time of the ultrasonic waves transmitted from the right ultrasonic sensor 11a and received by it after the waves are reflected by the driver's left hand D. Similarly, if the assistant operates the operating device 24, the assistant's right hand P is within a predetermined distance from the left ultrasonic sensor 11c. The center ultrasonic sensor 11b detects both of the driver's hand D and the assistant's hand P.

In other words, it is determined that the driver is operating the operating device 24 if an object located at the center portion is within a predetermined distance (L1<Ls) from the center sensor 11b and an object located at the right portion is within a predetermined distance (L2<Ls) from the right sensor 11a. Similarly, it is determined that the assistant is operating the operating device 24 if an object located at the center portion is within a predetermined distance (L4<Ls) from the center sensor 11b and an object located at the left portion is within a predetermined distance (L3<Ls) from the left sensor 11c.

Referring to FIG. 3 again, if it is determined that the operator is the assistance at step S111, the process proceeds to step S113, where the prohibition is canceled. That is, if the operator of the navigation device 20 is the assistant, the manipulation of the navigation device 20 is permitted because there is no danger in driving. If it is determined that driver is the operator at step S111, the process comes to the end, maintaining the prohibition state.

At the next step S115, whether manipulation of the navigation device 20 has been completed, or whether a predetermined time period has lapsed from the operation of the operating device 24 began. It is determined that the manipulation of the navigation device 20 is completed if a destination is set. The time period lapsed from the start of operation is detected by a timer, for example. If the manipulation of the navigation device 20 is completed or the predetermined time period has lapsed from the start of operation, the process proceeds to step S117, where the manipulation of the navigation device 20 is prohibited again. If not, the process stays there (S115) until the manipulation is completed or the time period lapses. By setting the prohibiting state again at step S117 after a certain time period has lapsed, it is avoided that the navigation device 20 is manipulated by the driver while the assistant is not operating the operating device 24. In this manner, safety in driving is further enhanced.

The embodiment of the present invention described above may be variously modified or changed. For example, the process shown in FIG. 3 may be initiated when the operating device 24 is manipulated. In this case, step S107 is eliminated. Power consumption in the operator-specifying apparatus 10 can be suppressed. The ultrasonic sensors 11 may be always in operation instead of bringing them in operation at step S109. Since the ultrasonic sensors 11a and 11c have a narrow directivity as mentions above, the right sensor 11a detects the driver's hand D while the left sensor 11c detects the assistant's hand P. Accordingly, the center sensor 11b may be eliminated. The ultrasonic sensors 11 may be operated with a time difference from one another, or a transmission interval of the ultrasonic waves may be varied. It is possible in this manner to distinguish a moving hand of an operator from a stable object placed on a passenger's seat, for example.

Figure 4:
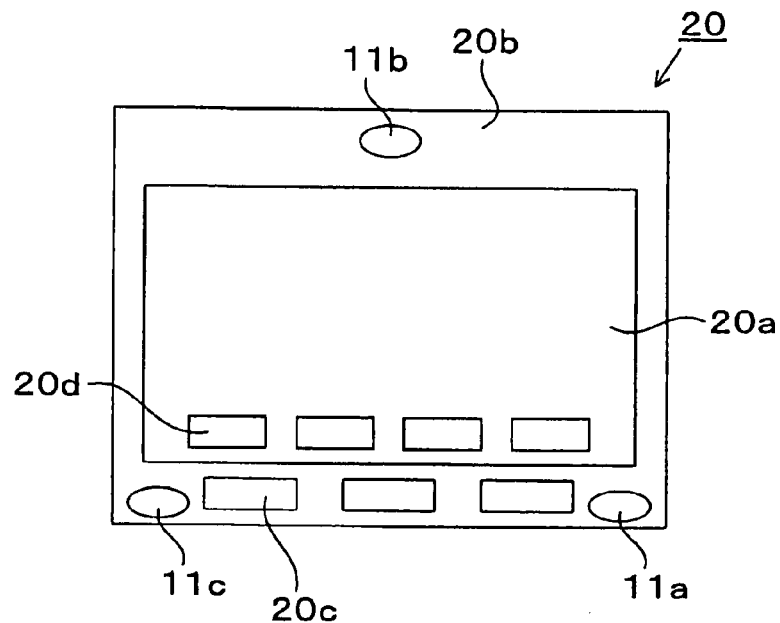
FIG. 4 is a front view showing a display panel, on which ultrasonic sensors are mounted in a modified manner.

The adjusting layers 14 may be eliminated, and the ultrasonic vibrators 13 may be directly mounted on a rear surface (a surface which is not seen from a passenger compartment) of the frame 20b. In this manner, the ultrasonic vibrators 13 become invisible from passengers, enhancing an ornamental design of the display panel 20a. As shown in FIG. 4, the ultrasonic sensors 11a and 11c may be mounted at lower corners of the frame 20b, while mounting the center sensor 11b at an upper center of the frame 20b. Since the sensors 11a, 11c are brought closer to the push buttons 20c (closer to an operator's hand) in this manner, detection sensitivity of the ultrasonic sensors 11a and 11c is improved.

Though the present invention is described, assuming that the operator-specifying apparatus is mounted on a vehicle having a steering wheel at the right side, the apparatus can be similarly mounted on a vehicle having a left side steering wheel. Though the operator-specifying apparatus 10 is applied to the navigation device 20 in the above explanation, it is similarly applicable to other on-board devices such as an audio device. By prohibiting manipulation of the on-board devices by a driver while the vehicle is being driven, safety in driving is promoted.

Advantages attained in the embodiment described above will be summarized below. Since the operator of the navigation device, either the driver or the assistant, is specified by detecting hands of the operator by ultrasonic sensors, it is surly avoided that the navigation device is manipulated by the driver while the vehicle is being driven. Thus, safety in driving is improved. On the other hand, since manipulation of the navigation device by the assistant, such as setting a destination, is permitted even when the vehicle is driven, the navigation device is conveniently and comfortably used. Since the ultrasonic sensors are used in detecting operator's hands, their signals can be easily processed, thereby making the apparatus inexpensive. Further, since the ultrasonic sensors have a narrow directivity, the driver's hand is clearly distinguished from the assistant's hand.

Figure 5A:
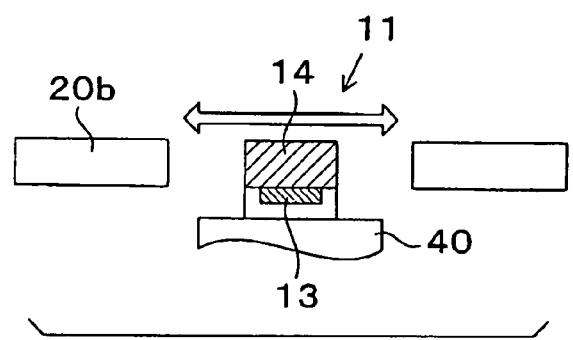
FIG. 5A is a fractional view showing an ultrasonic sensor having a horizontal mover.
Figure 5B:
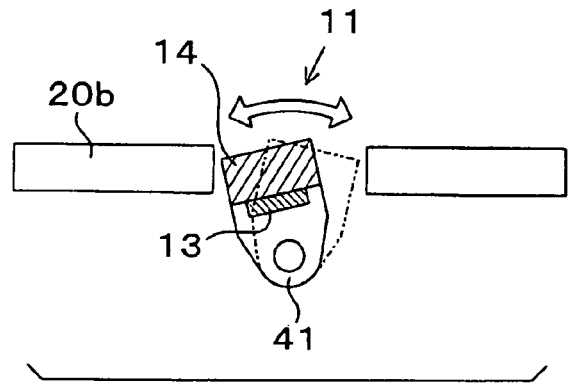
FIG. 5B is a fractional view showing an ultrasonic sensor having a rotator.

Some modified forms of the embodiment of the present invention will be described with reference to FIGS. 5A-7B. As shown in FIG. 5A, only one ultrasonic sensor 11 may be used, and the sensor 11 may be moved in the horizontal direction by a horizontal mover 40. The sensor 11 mounted at a center portion of the frame 20b is moved to detect the driver's hand or the assistant's hand in a certain interval. As shown in FIG. 5B, the single ultrasonic sensor 11 positioned in the center portion of the frame 20b may be rotated by a rotator 41. In this manner, the operator is specified with the single ultrasonic sensor 11.

As shown in FIG. 6A1, a sensor device 11 mounted on an upper center portion of the frame 20b may be composed of plural ultrasonic sensor elements. Each sensor element includes an ultrasonic vibrator element 13p, 13q mounted on an adjusting layer 14. The ultrasonic vibrator elements 13p, 13q are arranged in array as shown in FIG. 6A2. A horizontal directivity of the sensor device 11 can be made narrow by controlling a phase difference among the vibrator elements 13p, 13q lined in the horizontal direction.

As exemplified in FIG. 6B, the ultrasonic vibrator element 13p transmits an ultrasonic wave U1 and the ultrasonic vibrator element 13q transmits an ultrasonic wave U2, so that there is a phase difference between ultrasonic waves U1 and U2. An ultrasonic wave U3 strengthened by interference between U1 and U2 is transmitted in a direction that makes an angle θ with respect to a normal line on a surface of the adjusting layer 14. This means that the direction of the ultrasonic wave is controlled by controlling the phase difference. In this manner, the horizontal directivity of the ultrasonic sensor device 11 can be made narrow, and a distance in a specified direction can be accurately detected.

It is also possible to scan the ultrasonic wave in both of the horizontal and vertical directions by controlling phase differences among the plural ultrasonic vibrator elements. Thus, the number of the vibrator elements can be reduced. In the example shown in FIG. 6A1, 20 vibrator elements 13 are arranged in four columns and five rows. The number of the vibrator elements 13 and the number of columns and rows may be variously modified as long as the operator is specified. The ultrasonic vibrator elements may be formed by piezoelectric elements such as PZT, or may be integrally formed by using a micromachining technology.

Figure 7A:
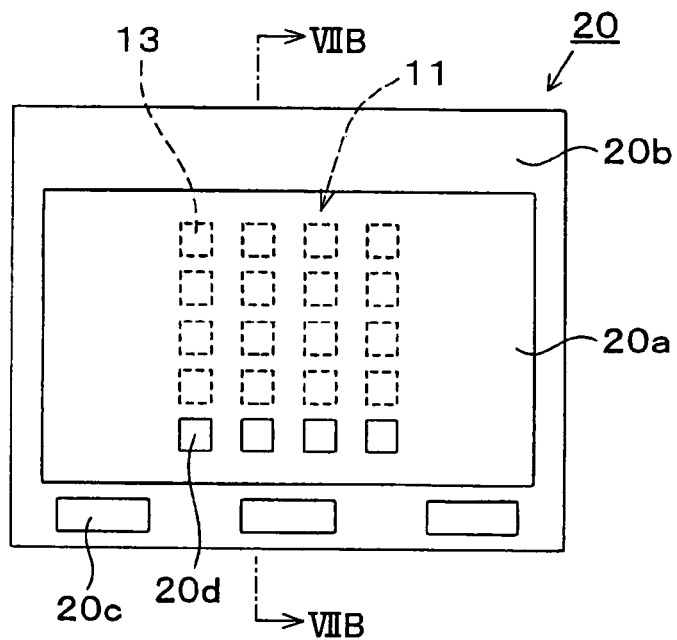
FIG. 7A is a front view showing a display panel, on a rear surface of which plural ultrasonic sensors are mounted.
Figure 7B:
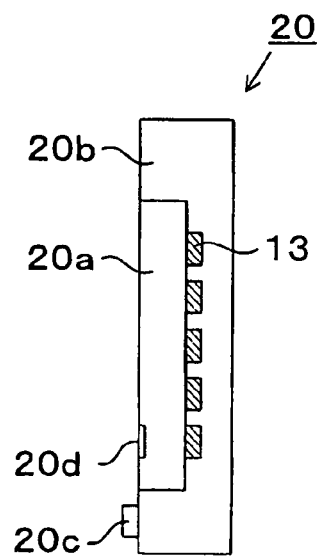
FIG. 7B is a cross-sectional view showing the plural ultrasonic sensors, taken along line VIIB-VIIB shown in FIG. 7A.

As shown in FIGS. 7A and 7B, ultrasonic vibrator elements 13 may be mounted on a rear surface of the display panel 20a and arranged in array. In this particular example, 20 ultrasonic vibrator elements 13 are arranged in four columns and five rows. Ultrasonic waves generated by the vibrator elements 13 are transmitted via the display panel 20a that functions as a transmitting medium. The ultrasonic waves can be scanned in the same manner as in the example shown in FIGS. 6A and 6B. In addition, the touch buttons 20d may be formed at positions corresponding to the lowest row of the vibrator elements 13. Thus, the vibrator elements 13 in the lowest row can be used also as pressure-sensitive elements. In other words, those elements are used as elements generating ultrasonic waves and as elements sensing a pressure from the touch buttons 20d. Since the ultrasonic vibrator elements 13 are invisible through the display panel 20a in the example shown in FIGS. 7A and 7B, an ornamental design effect of the display panel 20a is enhanced.

While the present invention has been shown and described with reference to the foregoing preferred embodiment and modified forms thereof, it will be apparent to those skilled in the art that changes in form and detail may be made therein without departing from the scope of the invention as defined in the appended claims.

What is claimed is:

1. An on-board apparatus for determining a person operating an on-board device, either a driver or an assistant, comprising:
an ultrasonic sensor device configured to detect a position of an operator's hand by transmission and reception of ultrasonic waves and for outputting signals indicating the position of the operator's hand; and
a device configured to determine that the operator is either the driver or the assistant based on the signals from the ultrasonic sensor device,
wherein the ultrasonic sensor device includes at least one ultrasonic sensor configured to detect a position of the driver's hand and at least one ultrasonic sensor configured to detect a position of the assistant's hand,
the ultrasonic sensor device has a directivity narrower in a horizontal direction in a vehicle than in a vertical direction.

2. The on-board apparatus as in claim 1, wherein:
the on-board device is a navigation device including switches or buttons to be manipulated by the driver or the assistant.

3. The on-board apparatus as in claim 2, wherein:
the ultrasonic sensor device is mounted on a rear surface of a display panel of the navigation device.

4. The on-board apparatus as in claim 3, wherein:
the ultrasonic sensor device is displayed on the display panel and functions as touch buttons.

5. The on-board apparatus as in claim 1, wherein:
the at least one ultrasonic sensor configured to detect the position of the driver's hand and the at least one ultrasonic sensor configured to detect the position of the assistant's hand are spaced apart from each other in a horizontal direction in a vehicle.

6. The on-board apparatus as in claim 1, wherein:
each of the ultrasonic sensors has an adjusting layer smaller in the vertical direction than in the horizontal direction to differentiate the directivity between the horizontal direction and the vertical direction.

7. An on-board device comprising:
an operating device configured to manipulate the on-board device by an operator, either a driver or an assistant;
a controller configured to control the on-board device based on inputs from the operating device;
an ultrasonic sensor device configured to detect positions of a driver's hand and an assistant's hand and to output signals indicating the positions of the driver's hand and the assistant's hand;
a determining device configured to determine that the operator is either the driver or the assistant based on the signals from the ultrasonic sensor device; and
means for prohibiting a predetermined operation of the operating device and for canceling the prohibition when it is determined that only the assistant is operating the operating device, wherein:
the ultrasonic sensor device includes at least one ultrasonic sensor for detecting a position of the driver's hand and at least one ultrasonic sensor for detecting a position of the assistant's hand, the ultrasonic sensors being spaced apart in a horizontal direction in a vehicle.

8. The on-board device as in claim 7, wherein:
the ultrasonic sensor device has a narrow directivity.

9. The on-board apparatus as in claim 7, wherein:
the ultrasonic sensor device includes a center ultrasonic sensor provided between the at least one ultrasonic sensor configured to detect the position of the driver's hand and the at least one ultrasonic sensor configured to detect the position of the assistant's hand; and
each of the ultrasonic sensors has an adjusting layer smaller in a vertical direction than in a horizontal direction in a vehicle thereby to narrow the directivity of the ultrasonic sensor in the horizontal direction than in the horizontal direction.

10. An on-board device comprising:
an operating device configured to manipulate the on-board device by an operator, either a driver or an assistant;
a controller configured to control the on-board device based on inputs from the operating device;
an ultrasonic sensor device configured to detect positions of a driver's hand and an assistant's hand and for outputting signals indicating the positions of the driver's hand and the assistant's hand;
a determining device configured to determine that the operator is either the driver or the assistant based on the signals from the ultrasonic sensor device; and
means for prohibiting a predetermined operation of the operating device and for canceling the prohibition when it is determined that only the assistant is operating the operating device, wherein:
the ultrasonic sensor device is composed of a plurality of ultrasonic sensor elements arranged in array, phases of ultrasonic waves transmitted from the plurality of ultrasonic sensor elements being controlled.

11. The on-board device as in claim 10, wherein:
the on-board device is a navigation device.

12. The on-board device as in claim 11, wherein:
the ultrasonic sensor device is mounted on a rear surface of a display panel of the navigation device.

13. The on-board device as in claim 12, wherein:
the ultrasonic sensor device is displayed on the display panel and functions as touch buttons.

14. An on-board device comprising:
an operating device configured to manipulate the on-board device by an operator, either a driver or an assistant;
a controller configured to control the on-board device based on inputs from the operating device;
an ultrasonic sensor device configured to detect positions of a driver's hand and an assistant's hand and to output signals indicating the positions of the driver's hand and the assistant's hand;
a determining device configured to determine that the operator is either the driver or the assistant based on the signals from the ultrasonic sensor device; and
means for prohibiting a predetermined operation of the operating device and for canceling the prohibition when it is determined that only the assistant is operating the operating device, wherein:
the ultrasonic sensor device includes a drive part configured to move the ultrasonic sensor device to positions where ultrasonic waves are directed toward the driver or the assistant.

15. An on-board apparatus for determining a person operating an on-hoard device, either a driver or an assistant, comprising:
an ultrasonic sensor device configured to detect a position of an operator's hand by transmission and reception of ultrasonic waves and for outputting signals indicating the position of the operator's hand; and
a device configured to determine that the operator is either the driver or the assistant based on the signals from the ultrasonic sensor device,
wherein:
the ultrasonic sensor device includes at least one ultrasonic sensor configured to detect a position of the driver's hand and at least one ultrasonic sensor configured to detect a position of the assistant's hand,
the at least one ultrasonic sensor configured to detect the position of the driver's hand and the at least one ultrasonic sensor configured to detect the position of the assistant's hand are spaced apart from each other in a horizontal direction in a vehicle, and
the ultrasonic sensor device further includes a center ultrasonic sensor provided between the at least one ultrasonic sensor configured to detect the position of the driver's hand and the at least one ultrasonic sensor configured to detect the position of the assistant's hand.

* * * * *